United States Patent [19]

Hort et al.

[11] 4,057,533

[45] Nov. 8, 1977

[54] PROCESS FOR PREPARATION OF QUATERNIZED CATIONIC VINYLLACTAM-ACRYLAMIDE COPOLYMERS

[75] Inventors: Eugene V. Hort, Piscataway, N.J.; Earl P. Williams, Pen Argyl, Pa.

[73] Assignee: GAF Corporation, New York, N.Y.

[21] Appl. No.: 627,017

[22] Filed: Oct. 29, 1975

Related U.S. Application Data

[63] Continuation-in-part of Ser. No. 268,840, July 3, 1972, abandoned, and a continuation-in-part of Ser. No. 27,171, April 9, 1970, abandoned.

[51] Int. Cl.² .......................... C08F 8/32; C08F 8/34
[52] U.S. Cl. .......................... 260/67.5; 162/168 NA; 210/54; 260/29.6 H; 526/264
[58] Field of Search .................. 260/67.5, 79.5 NV; 526/46

[56] References Cited

U.S. PATENT DOCUMENTS

| 2,980,657 | 4/1961 | Melamed | 526/46 |
| 3,406,155 | 10/1968 | Azorlosa et al. | 260/80.3 |

FOREIGN PATENT DOCUMENTS

| 887,900 | 1/1962 | United Kingdom | 260/80.3 N UX |
| 982,269 | 2/1965 | United Kingdom | 260/80.3 N UX |

*Primary Examiner*—Stanford M. Levin
*Attorney, Agent, or Firm*—Walter C. Kehm; Marilyn J. Maue

[57] ABSTRACT

A composition of matter which is useful as a flocculant for aqueous dispersions containing suspended solid particles and as a filler retention aid in paper-making, consisting essentially of quaternized cationic vinyllactam-acrylamide copolymer containing the following recurring units in a random distribution:

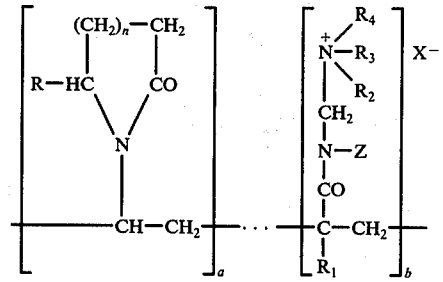

wherein R is selected from the group consisting of hydrogen, methyl and ethyl; $R_1$ is selected from the group consisting of hydrogen and methyl; $R_2$ and $R_3$ are selected from the group consisting of alkyl of 1 to 4 carbon atoms, hydroxyalkyl of 1 to 4 carbon atoms and together may represent the residue of a cyclic secondary amine, e.g., morpholine; $R_4$ is selected from the group consisting of alkyl of 1 to 6 carbon atoms or benzyl radicals (10-100%) and hydrogen (0-90%); and X represents an anion such as chloride, bromide, sulfate, methyl sulfonate, etc.; and Z is selected from the group consisting of hydrogen and the group

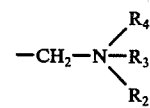

wherein $R_2$, $R_3$ and $R_4$ are as defined above; $n$ is a positive integer of from 1 to 3; $a$ represents a range of 30 to 95% by weight of the lactam moiety in said copolymer; $b$ represents a range of 5 to 70% by weight of the acrylamide moiety in said copolymer; and the relative viscosity of said copolymer is from about 5 to about 50 as measured using 1 gram of copolymer in solution in 100 ml. of water at 25° C., and the process of making and using same.

8 Claims, No Drawings

PROCESS FOR PREPARATION OF QUATERNIZED CATIONIC VINYLLACTAM-ACRYLAMIDE COPOLYMERS

This application is a continuation-in-part of applications Ser. No. 27,171 filed Apr. 9, 1970 and Ser. No. 268,840, filed July 3, 1972, both now abandoned.

The present invention relates to a new composition of matter comprising quaternized cationic vinyllactam-acrylamide copolymers useful as flocculants and filler retention aids in paper-making.

It is an object of the present invention to provide a new and useful class of quaternized cationic vinyllactam-acrylamide copolymers.

Another object is to provide a process for making a filled paper composition while employing said copolymers.

A still further object is to provide a process for flocculating suspended solids from sewage and contaminated waters.

A further object is to provide a process for making a quaternized cationic vinyl lactam-acrylamide copolymer having a K-value less than 200 and the copolymeric product of the process.

Other objects and advantages will become manifest from the following description and disclosure.

We have discovered that in the attainment of the foregoing objects, it is necessary to prepare the quaternized cationic vinyllactam acrylamide copolymer by first copolymerizing in a polymerization apparatus from 30 to 95% by weight of an N-vinyllactam monomer with from 5 to 70% by weight of acrylamide or methacrylamide in aqueous solution with a free radical catalyst such as, for example, azobisisobutyronitrile, lauroyl peroxide, benzoyl peroxide, tertbutylperbenzoate, hydrogen peroxide plus ammonia, etc., at a neutral or slightly alkaline pH to minimize the hydrolysis of the comonomers at a temperature of from about 25° to 150° C. The resulting viscous, colorless solution (base copolymer) has a relative viscosity (1 gram of copolymer in 100 ml. water at 25° C.) of from about 5 up to about 50. The relative viscosity will depend on reaction temperature and monomer concentration. Cationic vinyllactams can be prepared by any of the known techniques such as for example as disclosed in U.S. Pat. No. 3,406,155; British Pat. No. 982,269 and British Pat. No. 887,900 which methods of cationization are hereby incorporated by reference.

In the past, quaternized copolymers of vinyl-lactam and acrylamides have been formed by first quaternizing the lactam and then subjecting the quaternized lactam to copolymerization. However, the product thus obtained varies markedly in structure from the product of the present process for the reason that the reactivity rate for the cationic moiety is significantly higher than the rate for homo- or copolymerization of the amide. Consequently, prior processes have resulted in large homopolymer blocks of the lactam in place of the present, more randomly distributed monomers or in substantially lactam homopolymer wherein the comonomer is present as terminal groups ending the homopolymer chain. These quaternized copolymers have conventionally high K-values, minimally from about 250 upwards, e.g. 400 and above.

In contrast, the products of the present invention are prepared by initially copolymerizing the lactam and amide monomers and then reacting the resulting copolymer with formaldehyde and a secondary amine to give a cationic vinyllactam-acrylamide copolymer which is finally quaternized by reaction with an ester of an inorganic acid such as for example, methyl chloride, ethyl chloride, methyl bromide, ethyl bromide, propylchloride, hexylchloride, alkylsulfates, such as dimethyl sulfate, benzylchloride, and alkyl esters of sulfonic acids to provide the desired quaternized cationic vinyllactam-acrylamide copolymer having more random distribution of monomers and a viscosity K-value less than 200.

The N-vinyllactams which are copolymerized with either acrylamide or methacrylamide are characterized by the following formula:

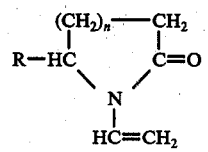

wherein R is either hydrogen, methyl or ethyl group and $n$ an integer of from 1 to 3.

As specific illustrations of such N-vinyllactams, the following are representative:

N-vinyl-2-pyrrolidone
N-vinyl-5-methyl-2-pyrrolidone
N-vinyl-5-ethyl-2-pyrrolidone
N-vinyl-2-piperidone
N-vinyl-6-methyl-2-piperidone
N-vinyl-6-ethyl-2-piperidone
N-vinyl-2-caprolactam
N-vinyl-7-methyl-2-caprolactam
N-vinyl-7-ethyl-2-caprolactam Prior to copolymerization, the free radical catalyst may be dissolved in the N-vinyllactam and the resulting solution added to a solution of the acrylamide or methacrylamide in water or other suitable solvent. The concentration of acrylamide or methacrylamide in the aqueous solution may range from 2% to 50% by weight. The pH of the solution may then be adjusted so as to be neutral or slightly alkaline with a buffer solution such as those containing dibasic sodium phosphate, dibasic potassium phosphate, sodium ammonium phosphate, and the like. The aqueous solution of the acrylamide or methacrylamide preferably comprises water or an aqueous alcoholic solution. The resulting solution may then be placed in any conventionally sealed polymerization apparatus, such as, for example, a Pyrex polymerization tube which has been cooled and evacuated. The sealed tube can be placed in a constant temperature bath for a period of time ranging from 1 to 10 hours and then transferred into a steam bath for 1 to 10 hours. The resulting viscous colorless solution has a relative viscosity from about 5 up to about 50. It may then be diluted, or concentrated, to a concentration suitable for further reaction and preferably from 5 to 25% weight by volume, with a suitable solvent such as for example, distilled water or aqueous alcohol solution. The solution of the copolymer is then reacted with formaldehyde and a secondary amine at an alkaline pH to form a cationic solution of the copolymer. This reaction can be effected in two steps e.g. by first reacting the copolymer solution with formaldehyde to form methylol acrylamide or methylol methacrylamide groups and then reacting the resulting solution with the dialkylamine, dialkanolamine, or morpholine to form the cationic copolymer. Alternatively, the formaldehyde and dialkylamine, or dialkanolamine or morpholine may be added, sequentially to the copolymeric solution or the formaldehyde and dialkylamine, dialkanolamine or morpholine may be premixed and then added to the copolymer solution. Other convenient techniques of contacting the reactants may also be employed.

The mole ratio of the said secondary amine or morpholine, formaldehyde/acrylamide or methacrylamide moiety can be varied over a wide range with there being either an excess of or less formaldehyde with respect to the secondary amine; although the preferred ratio of said secondary amine or morpholine to formaldehyde is such that there is a slight excess of the formaldehyde whereby the acrylamide or methacrylamide moiety in the copolymer will contain one or more of the cationic groups

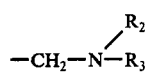

wherein $R_2$, $R_3$ and $R_4$ are as previously defined. The resulting cationic vinyllactam-acrylamide copolymer is then quaternized in the presence of an organic ester of an inorganic acid at a temperature of from about 30° C. to about 120° C. for a period of 0.5 to 10 hours, or until at least almost 10% of the available nitrogen in the amine group is quaternized with the organic residue. The active product which results, having flocculent properties, is a quaternized cationic copolymeric N-vinyllactam containing the following moieties:

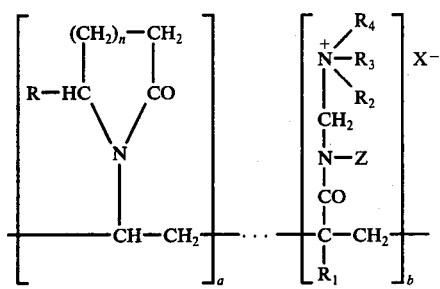

wherein the symbols R, $R_1$, $R_2$, $R_3$, $R_4$, Z, X, $n$, $a$ and $b$ are as defined above. Preferably $R_2$ and $R_3$ are either methyl, ethyl, hydroxyethyl or together represent the residue of morpholine; $R_4$ represents the organic residue of the quaternizing agent up to about 90% of unchanged hydrogen; in the total copolymeric product; preferably not more than about 70% of unchanged hydrogen; $a$ represents from 30% to 80% by weight of the lactam moiety and $b$ represents from 20% to 70% by weight of the acrylamide or methacrylamide moiety in the copolymer.

The following examples will serve to illustrate specific embodiments for the preparation of the cationic N-vinyllactam acrylamide copolymer and quaternization thereof. It is to be understood, however, that any of the foregoing lactams, or secondary amines and quaternizing agents may be substituted in the following Examples to provide the corresponding copolymeric quaternized product. For the sake of brevity it is to be understood that the term "acrylamide" includes both acrylamide, per se, and methacrylamide.

EXAMPLE 1

A 60 weight percent N-vinyl-2-pyrrolidone and 40 weight percent acrylamide copolymer was prepared by dissolving 0.024 gram of azobisisobutyronitrile in 7.2 grams of redistilled commercial N-vinyl-2-pyrrolidone. To the solution there was then added a solution of 4.8 grams of acrylamide in 100 ml. of distilled water. The pH of the solution was adjusted to 8 with 35 drops of 10 percent aqueous solution of dibasic sodium phosphate. The total volume was made up to 150 ml. with distilled water. The resulting solution was placed in a Pyrex polymerization tube, which was cooled to 0° C., evacuated, and the neck sealed off. The tube was placed in a 65° C. constant temperature bath for 3 hours, then in a steam bath for 2 hours. A N-vinyl-2-pyrrolidone-acrylamide copolymer was formed.

EXAMPLE 1A

About 0.75 mole of a copolymer prepared as in Example 1 was reacted with 0.75 mole of formaldehyde, 1.0 mole dimethylamine at 60° C. and then treated with 2.0 moles of methylchloride per mole of acrylamide unit at 50° C. The resultant polymer had 41.5% of its nitrogen in the quaternized form.

EXAMPLE 2

Into a 3-liter, 4-neck flask fitted with a condenser, thermometer, dropping funnel, agitator and gas inlet tube for nitrogen blanketing there was charged 73.0 g. acrylamide and 1486 ml. distilled water. The mix was stirred until completely dissolved, and then the pH was adjusted to 7.8, with 10% $Na_2HPO_4.7H_2O$ solution. The flask was thoroughly flushed with nitrogen and 171.0 g. vinylpyrrolidone were introduced through the dropping funnel followed by 1.45 g. t-butyl peroxypivalate. The solution was heated to 50° C. and cooled as required to maintain a temperature of 50° C during the exothermic initial polymerization. After 1 hour at 50° C., the temperature was raised to 60° C. and held at 60° C. for 4 hours. The copolymeric solution was then cooled and discharged.

EXAMPLE 3

The base copolymer of Example 1 was quaternized by charging a copolymer solution containing 100 grams of solid and 500 ml. of distilled water into a 3-liter, 4-neck flask fitted with a condenser, thermometer, dropping funnel, agitator and gas inlet tube. After stirring to homogeneity, the pre-mixed solution which had been prepared at a temperature below 30° C. from 39.5 grams 37% formaldehyde and 47.8 grams 40% dimethylamine was added over a 20-minute period. The mixture was agitated for 2 hours at a temperature between 65° and 70° C. and the resulting solution was charged into a one-gallon stainless steel stirred autoclave. At 50° C. the solution was stirred under full cylinder pressure of methyl chloride (35 to 40 psig.) for 4 hours. The reactor was vented at 50° C. and purged with nitrogen and the resulting quaternized copolymeric product recovered.

EXAMPLE 4

Example 3 was repeated with the exception that 79 grams 37% formaldehyde and 95.6 grams 40% dimethylamine were employed. The resulting cationic product contains a plurality of units wherein the amino moiety contains two cationic quaternizable nitrogens. At lower concentrations of amine and formaldehyde, only the terminal nitrogen in the amino moiety may be cationized so that only one site therein is quaternizable.

EXAMPLE 5

A solution containing 952 grams of copolymer was prepared as in Example 2 and 492 ml. of distilled water were charged into a 3-liter, 4-neck flask fitted with a condenser, thermometer, dropping funnel, agitator and gas inlet tube and stirred to homogeneity. An equivalent amount of premixed solution of 37% formaldehyde and 40% dimethylamine as in Example 3 was added over a 20-minute period. After heating for 2 hours at 65°–70° C., the solution was charged into a one-gallon stainless steel stirred autoclave. The mixture was stirred at 50° C. under the full cylinder pressure of methyl chloride for a period of about 4 hours after which time the reactor was vented at 50° C. and purged with nitrogen and the resulting quaternized copolymeric product was recovered.

EXAMPLE 6

Example 5 was repeated with the exception that 2 equivalents of formaldehyde (37%) and dimethylamine (40%) were employed to provide a quaternized copolymeric product containing a plurality of amino units having two quaternized tert-amino sites per unit.

EXAMPLE 7

Into a 3-liter, 4-neck flask fitted with a condenser, thermometer, dropping funnel, agitator and gas inlet tube for nitrogen blanketing there was charged 122.0 g. acrylamide and 1486 ml. distilled water. The mix was stirred until completely dissolved, and then the pH was adjusted to 7.8, with 10% $Na_2HPO_4.7H_2O$ solution. The flask was thoroughly flushed with nitrogen and 122.0 g. vinylpyrrolidone was introduced through the dropping funnel followed by 1.45 g. t-butyl peroxypivalate. The solution was heated to 50° C. and cooled as required to maintain 50° C. during the exothermic initial polymerization. After 1 hour at 50° C., the temperature was raised to 60° C. and held at 60° C. for 4 hours. The copolymer solution was cooled and discharged.

EXAMPLE 8

Example 1 was repeated with the exception that 7.2 grams of N-vinyl-2-pyrrolidone were replaced by 7.2 grams of N-vinyl-2-piperidone. Additionally, the copolymer was treated with 1.0 mole formaldehyde and with 1.0 mole dimethylamine per mole of acrylamide unit followed by reaction with 1.0 mole of benzylchloride per mole dimethylamine, the resultant polymer had 50% of its available nitrogen in the quaternized form.

EXAMPLE 9

Examples 1 and 3 were repeated with the exception that 7.2 grams of N-vinyl-2-pyrrolidone were replaced by 7.2 grams of N-vinyl-2-caprolactam, and was reacted in an autoclave with 0.75 moles of formaldehyde, 1 mole dimethylamine and 1.6 moles of methyl chloride per mole of acrylamide unit. The resultant polymer had 41.5% of its available nitrogen in quaternized form.

EXAMPLE 10

Example 1 was again repeated with the exception that 7.2 grams of N-vinyl-2-pyrrolidone were replaced by 7.2 grams of N-vinyl-5-methyl-2-pyrrolidone and the 4.8 grams of acrylamide were replaced by 4.8 grams of methacrylamide. The product was quaternized as in Example 3.

EXAMPLE 11

An 8% solution of a 70/30 (weight percent) vinylpyrrolidone/acrylamide copolymer was treated with 2.3 moles of 37% formaldehyde and 2.0 moles of 37% dimethylamine per mole of acrylamide and heated to 65° for 2 hours. At 50° C. and under 40 psig. of pressure it took up 2.0 moles of methyl chloride in a 4-hour period. The product had 11.5% solids and 13.0% chlorine (dry basis). The theoretical chlorine content for replacement of one amide hydrogen and quaternization is 9.9%, for replacement of both hydrogens and quaternization 14.8%.

EXAMPLE 12

Three separate 80 weight percent N-vinyl-2-pyrrolidone and 20 weight percent acrylamide copolymers of different molecular weight were prepared in aqueous solution by the procedure described in Example 1, while employing isopropanol as a chain transfer agent.

| Charged: | | | |
|---|---|---|---|
| Azobisisobutyronitrile (g) | 0.030 | 0.030 | 0.030 |
| N-vinyl-2-pyrrolidone (g) | 12.00 | 12.00 | 12.00 |
| Acrylamide (g) | 3.00 | 3.00 | 3.00 |
| Isopropanol (g) | None | 0.45 | 1.50 |
| Distilled $H_2O$ to total volume of (ml.) | 150 | 150 | 150 |
| Relative viscosity 1% (w./v.) aqueous solution of copolymer | 9.8 | 8.4 | 6.5 |

As shown above the presence of an alcohol, preferably $C_1$ to $C_4$ alkanol functions to lower molecular weight of the copolymer by terminating the polymer chain. The products of this example were then quaternized as in Example 3.

The quaternized cationic copolymers, as above prepared, are ideally adapted as flocculating agents in the clarification of water for industrial use, e.g., silty river water, mine underground water, boiler water, raw water, drilling water, and in the settling of ore and coal fines. The dosage levels in such use may range from 0.5 to 100 parts per million of flocculating agent per volume of mineral solids. In brief, the process of flocculation consists of adding the quaternized cationic N-vinyllactamacrylamide copolymer to a given suspension with sufficient agitation to insure uniform distribution.

When the system is quiescent, the flocculated aggregates will settle out. In general, there is an optimum range for the flocculant/suspended fines ratio. At too high a concentration, the flocculant would act as a suspending agent.

The quaternized cationic copolymers are very effective in varied operations in the pulp and paper industry. The addition of 1 ounce to 1 pound (solid basis) per ton of paper pulp (cellulosic wood) fiber (dry basis) in the form of about 0.05% aqueous solution at the head box or fan pumps provides significant savings since less filler is lost in the "white water". This is particularly important when an expensive pigment like titanium dioxide is used. They are also effective in "white water" effluent wastes from bond mills and similar operations. Such wastes are readily clarified at loadings of 0.1 to 1.5 parts per million of the cationic copolymer.

It is known that cationic vinyllactam acrylamide copolymers and quaternary polyelectrolytes in general have been employed as flocculating agents and retention aids in paper making processes. It is noted, however, in this connection that the quaternized cationic vinyl pyrrolidone acrylamide copolymers of the instant invention produce an unexpected and substantially improved result over that which was previously obtained with the above-mentioned compounds. The following examples are cited to demonstrate this improved flocculation and retention characteristic which has been discovered and is disclosed herein.

EXAMPLE 13

The polymer of Example 1A was mixed with a raw city sewage (Easton, Pennsylvania) at various levels of flocculant solids on sewage volume. The resultant flocculation was compared after three minutes with that obtained in the same time with a commercial polyacrylamide (Dow Purifloc C-31).

| | Flocculation | |
|---|---|---|
| PPM. Polymer (on volume sewage) | Example 1A Polymer | Dow Purifloc C-31 Polymer |
| 5 | Some flocculation | No flocculation |
| 15 | Good flocculation | Some flocculation |
| 25 | Very good flocculation | Fair flocculation |
| 50 | Very good flocculation | Good flocculation |

As will readily be seen from the above table, the quaternized cationic vinylpyrrolidone-acrylamide copolymer of the instant invention resulted in substantially improved results in substantially lower amounts.

EXAMPLE 14

The procedure of Example 13 was repeated using the polymers prepared in Examples 3, 8 and 9. As a control, unquaternized cationic "poly-vinylpyrrolidone/acrylamide" was used for comparison. As will be seen from Table 2, the quaternized compounds of the instant invention resulted in far superior flocculation in far lower quantities then that which could previously be obtained with the cationic poly-vinylpyrrolidone acrylamide copolymers.

EXAMPLE 15

The polymer composition of Example 3 was mixed with raw river water at various levels of flocculant based upon the volume of water. The resultant clearing was rated as follows after three minutes in comparison to an unquaternized cationic polyvinyl pyrrolidone/acrylamide copolymer.

TABLE 3

| PPM. (on volume water) | Clarification by Example 3 Polymer | Clarification by Unquaternized cationic Polyvinyl pyrrolidone Acrylamides |
|---|---|---|
| 0.5 | Very good | Good |
| 1.25 | Good to Very good | Good |

EXAMPLE 16

Standard Georgia Kaolin was added to dry bleached sulfite pulp (27° S.R.) at 3% consistency and mixed for 20 minutes. The resultant slurry was then diluted to 0.3% consistency and 0.2% of an alkyl ketene dimer sizing compound (Aquapel 360, Hercules Power Company) solids were added based upon the weight of the fiber. This slurry was stirred for 30 seconds and the polymer to be tested as a retention aid was added as a 0.0475% solution which amount corresponds to 8 ounces of a 100% polymer per ton of fiber dry basis. The slurry was once again hand stirred for 30 seconds and handsheets were formed therefrom. The handsheets were then pressed and dried in a steam-heated dryer. Filler retention was then determined by ashing the handsheets. As will be appreciated from Table 4, the compositions of the instant invention were substantially better as retention aids than either unquaternized cationic polyvinyl pyrrolidone acrylamide copolymers or commercially available quaternized polyacrylamide.

TABLE 2

| PPM. Polymer (on volume of sewage) | Cationic Unquaternized PVP/Acrylamide | Flocculation Using Polymer of Examples | | |
|---|---|---|---|---|
| | | III | VIII | IX |
| 5 | No flocculation | Fair Flocculation | Some flocculation | Some flocculation |
| 15 | No flocculation | Good flocculation | Good Flocculation | Good flocculation |
| 25 | No flocculation | Very good flocculation | Very good flocculation | Very good flocculation |
| 50 | No flocculation | Very good flocculation | Very good flocculation | Very good flocculation |

TABLE 4

| | % Ash | % Gain Versus Control | % Gain (Loss) Versus Commercial Quat. Polyacrylamide | % Gain Versus Cationic Unquaternized Polyvinyl Pyrrolidone/ Acrylamide |
|---|---|---|---|---|
| Control (no retention aid) | 6.38 | — | — | — |
| Commercial quaternized acrylamide (Reten 205 MH 44% quaternized Hercules Powder Co.) | 8.92 | 39.9 | — | 15.9 |
| Cationic non-quaternized polyvinyl pyrrolidone acrylamide | 8.57 | 34.4 | (13.7) | — |
| Example 1A polymer | 9.17 | 43.8 | 9.9 | 27.3 |
| Example V polymer | 9.09 | 42.5 | 6.7 | 23.8 |

EXAMPLE 17

A 0.1% aqueous dispersion of a dry carbon black Paris II (Columbia Carbon) was prepared. A flocculant comprising 0.05% solids which flocculant corresponded to the polymer of Example 1A was added to 250 ml. of carbon black dispersion in 1 or more equal increments separated by 10 inversions of the 250 ml. cylinder containing said dispersion. The rate and quality of flocculant were determined at various times up to 5 minutes after the last inversion. The quality of the supernatant was also noted at the end of the test period. When a 0.5% solids solution of the polymer of Example 1A was added, there was immediate flocculation, moderately rapid settling, and good effluent clarity after 5 minutes. When a nonquaternized cationic PVP acrylamide copolymer was added at 1 part per million concentration there was slow flocculation which took approximately 1 minute, slow settling, and poor to fair effluent clarity after 5 minutes.

consistency bleached sulfite pulp as a dry powder. Flocculant was added from a 0.5% solids solution in a simulated fan pump addition in one or two equal increments separated by 30 seconds hand stirring. Sheets were formed from the resultant dispersion pressed and dried in a steam-heated paper dryer. As will be seen from Table 6 the flocculants and retention aids of the instant invention were far more effective than were the quaternized acrylamides which were the same quaternized acrylamides used in Example 16 or the cationic polyvinyl pyrrolidone acrylamide copolymer which was unquaternized.

TABLE 6

| Identification | No. of Increments | Total Ounces Flocculant/Ton Fiber | Black Retained in Sheet vs. Control | "White water Clarity" (absence of carbon black) |
|---|---|---|---|---|
| Control | — | 0 | Standard | Poor |
| Example 1A polymer | 1 | 5 | 70% stronger | Very good |
| | 1 | 20 | 100% stronger | Very good |
| | 2 | 10 | 90% stronger | Very good to excellent |
| | 2 | 20 | 100% stronger | Very good to excellent |
| Quaternized Acrylamide | 1 | 20 | 70% stronger | Very good to excellent Very good |
| Cationic PVP/ Acrylamide (Non-quaternized) | 1 | 20 | 60% stronger | Very good |

EXAMPLE 18

At 0.5% dispersion was prepared comprising a 38% carbon black formulation containing approximately 13% of a sulfonated napthalene formaldehyde condensate (Blancol-Permanent Black B paste) as dispersant. Bleached Kraft pulp was added to the dispersion to make a consistency of 0.02% fiber. The procedure of Example 17 was followed and as will readily be noted from Table 5, the quaternized polymer of the instant invention resulted in an excellent and rapid flocculation where as the unquaternized cationic polyvinyl pyrrolidone acrylamide copolymer required a much longer time period and a much higher concentration to obtain results which were not nearly as good as those obtained with the quaternized copolymer as can be seen from Table 5.

EXAMPLE 20

The procedure of Example 19 was repeated except that the carbon black dispersion of Example 18 was added from an aqueous suspension rather than as a dry powder. As will readily be seen from the following Table 7, the flocculants of the instant invention are far superior to those previously known in the art.

TABLE 7

| Identification | No. of Increments | Total Ounces Flocculant/Ton Fiber | Black Retained in Sheet vs. Control | "White Water" Clarity (absence of carbon black) |
|---|---|---|---|---|
| Control | — | 0 | Standard | Poor |
| Example 1A polymer | 1 | 5 | 200% stronger | Poor – fair |
| | 1 | 20 | 350% stronger | Very good |
| | 2 | 10 | 275% stronger | Good – very good |
| | 2 | 20 | 300% stronger | Very good |
| Quaternized Acrylamide | 1 | 20 | 150% stronger | Poor – fair |
| Cationic PVP/ Acrylamide (non-quaternized) | 1 | 20 | 25% strong | Poor |

TABLE 5

| Total ppm. | Number of Increments | Quality of Flocculation | Time to Initial Flocculation |
|---|---|---|---|
| polymer of Example 1A | | | |
| 1.5 | 3 | fair to good | 30 seconds |
| 2.0 | 4 | very good | 15 seconds |
| 2.0 | 1 | none | over 5 minutes |
| 4.0 | 1 | very good | 15 seconds |
| non-quaternized cationic polyvinyl pyrrolidone acrylamide polymer | | | |
| 4.0 | 8 | none | over 5 minutes |

EXAMPLE 19

0.8% based upon the weight of the fiber of the carbon black dispersion of Example 17 was added to a 3%

EXAMPLE 21

A 60 weight percent N-vinyl-2-pyrrolidone and 40 weight acrylamide copolymer was prepared following the method of Example 1.

652 g. of the copolymer in 100 ml. of distilled water (100 g. solids) was cationized by reaction with 31.8 g. formaldehyde (37%) and 34.1 g. 40% dimethylamine. The reaction was carried out by first preparing a premix of the dimethylamine and the formaldehyde and maintaining the mixture at a temperature under 30° C. by cooling until addition thereof to the copolymer. The copolymer solution was charged to the reaction flask and the premixed solution added thereto over a 15 minute period. The mixture thusly obtained was maintained with agitation at a temperature of between 65° and 70° C. for two hours and the product then discharged into a two-quart container. The reaction flask was washed with 500 ml. distilled water and the wash solution added to the product. The resulting product was rolled on rollers for 40 minutes to insure homogeneity and subsequently quaternized with methyl chloride as described in Examples 24–26.

EXAMPLE 22

Example 21 was repeated with the exception that 24.6 g. of 37% formaldehyde were used in this instance.

EXAMPLE 23

Example 21 was again repeated with the exception that 19.7 g. of 37% formaldehyde were utilized in this case.

The products of Examples 21, 22 and 23 were then analyzed and evaluated. The results obtained have been set out in the following table:

TABLE 8

|  | Example 21 | Example 22 | Example 23 |
|---|---|---|---|
| % Solids | 9.16 | 8.66 | 8.77 |
| Brookfield Viscosity LV (3–12) | 5,500 | 4,350 | 5,100 |
| pH | 8.70 | 9.30 | 10.7 |
| Relative Viscosity |  |  |  |
| 1% | 6.781 | 7.000 | 7.479 |
| 0.5% | 1.322 | 1.360 | 1.383 |
| Int. Viscosity |  |  |  |
| 1% | 2.68 | 2.74 | 2.87 |
| 0% | 2.93 | 3.24 | 3.24 |
| K-value (H$_2$O) | 105.8 | 106.9 | 108.8 |

EXAMPLES 24 – 26

The base cationic copolymers of Examples 21 to 23 (A, B and C respectively) were quaternized as hereinafter set out. 500 g. of each of the copolymers were reacted with 10 g. diethanolamine, 7 g. 50% acetic acid and 0.7 ml. 28% NH$_4$OH. The quaternization was carried out by heating the mixtures in each case to 50° C with agitation and holding at this temperature for 2 hours. Thereafter, a dry ice cooled condenser was installed in each reaction vessel and methyl chloride was introduced at a sufficient rate to maintain a slow reflux.

The reaction temperature was maintained at 50° C. under reflux for 3 hours. The mixtures were then cooled to room temperature and allowed to stand overnight. The reaction mixtures were examined and it was noted that reaction mixture A was slightly viscous and that B and C were thick but not gelled. The reaction mixtures A, B and C were heated to 50° C with agitation and under reflux. After 7 hours, the reaction mixtures were cooled. The reaction mixtures A and B were thick but pourable, but reaction mixture C appeared to have gelled. The results of the analysis carried out on the products of the three examples is set out in the following table:

TABLE 9

|  | A | B | C |
|---|---|---|---|
| % Solids | 11.61 | 11.08 | 12.74 |
| K-value | 127.5 | 125.3 | 133.9 |
| Brookfield Viscosity | 15,800 | 57,000 | >100,000 |
| Relative Viscosity | 14.17 | 13.07 | 17.92 |
| pH | 6.90 | 7.10 | 6.9 |

EXAMPLES 27, 28, 29

500 g. of the copolymers were quaternized as set out in Examples 24 – 26. A total of 22 g. (A), 23 g. (B) and 25 g. (C) methyl chloride was added. In addition, after 1½ hours (A), 1¾ hours (B) and about 2 hours (C) of refluxing, the reaction mixtures were diluted with 200 ml. water. The mixtures were cooled after 3 hours and 20 minutes and were quite viscous. The results of analysis of the products show the following:

TABLE 10

|  | A | B | C |
|---|---|---|---|
| Actual Wt. Gain | 6. g. | 10 g. | 10 g. |
| % Solids | 7.81 | 7.45 | 7.65 |
| K-value | 155 | 157.5 | 156.6 |
| Rel. Viscosity | 41.67 | 46.03 | 44.47 |
| Brookfield | 3060 cps. | 13,600 cps. | 4,700 cps. |
| pH | 6.10 | 7.10 | 6.30 |
| Appearance | Viscous but mobile | Partly gelled | Partly gelled |

As indicated above the quaternized copolymers having higher K-values are more viscous. At K-values of about 200, handling of the material becomes difficult and flocculant or retention aid solutions become limited to 1-2% concentration of the quaternized copolymer which significantly lowers efficacy and requires uneconomically large volumes of treating agent to provide the desired result.

We claim:

1. The process which comprises the steps sequentially in combination:

A. copolymerizing between about 30 and 95 percent by weight of a N-vinyllactam having the formula:

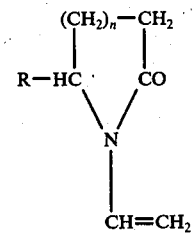

wherein R is hydrogen, methyl or ethyl and $n$ is an integer of 1 to 3, with between about 5 and about 70 percent by weight of acrylamide or methacrylamide in a nonacidic aqueous solution in the presence of a free radical catalyst at a temperature of between about 25° and about 150° C.;

B. reacting the resulting copolymer with formaldehyde and a secondary amine having the formula:

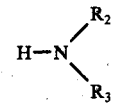

wherein R$_2$ and R$_3$ are independently selected from the group consisting of alkyl having from 1 to 4 carbon atoms, hydroxyalkyl having from 1 to 4 carbon atoms and together may represent morpholine, to produce the corresponding cationic vinyllactam-acrylamide copolymer; and C. quaternizing the cationic polymer by reacting with a compound selected from the group consisting of a benzyl halide, an alkyl halide having from 1 to 6 carbon atoms, an alkyl sulfate having from 1 to 6 carbon atoms, an alkyl ester of sulfonic acid having from 1 to 6 carbon atoms and mixtures thereof to produce a quaternized copolymer having a K value less than 200 consisting essentially of the following recurring units in primarily random distribution:

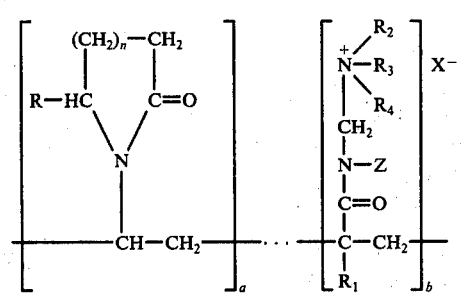

wherein R, $R_2$, $R_3$ and $n$ are as defined above; $R_1$ is selected from the group consisting of hydrogen and methyl; $R_4$ is selected from the group consisting of alkyl having 1 to 6 carbon atoms and benzyl radicals in an amount of 10 to 100% by weight and hydrogen in an amount of 0 to 90% by weight; X represents an anion; Z is selected from the group consisting of hydrogen and

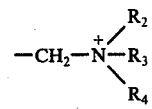

wherein $R_2$, $R_3$, and $R_4$ are as defined above; $a$ represents from 30 to 95 percent by weight of the lactam moiety in the copolymeric product; $b$ represents from 5 to 70 percent by weight of the acrylamide moiety in said copolymeric product.

2. The process of claim 1 wherein at least 10% of the available nitrogen of the cationic copolymer obtained in Step (B) is quaternized.

3. The process of claim 2 wherein not more than 70% of $R_4$ is hydrogen.

4. The process of claim 1 wherein the quaternized copolymeric product contains 30% to 80% by weight of component $a$.

5. The process of claim 1 wherein the N-vinyllactam is N-vinyl-2-pyrrolidone.

6. The process of claim 1 wherein the N-vinyllactam is N-vinyl-2-piperidone.

7. The process of claim 1 wherein the N-vinyllactam is N-vinyl-2-caprolactam.

8. The process of claim 1 wherein the N-vinyllactam is N-vinyl-5-methyl-2-pyrrolidone.

* * * * *